United States Patent
Miyamoto et al.

(10) Patent No.: US 11,211,856 B2
(45) Date of Patent: Dec. 28, 2021

(54) RESOLVER

(71) Applicant: TOYOTA JIDOSHA KABUSHIKI KAISHA, Toyota (JP)

(72) Inventors: Noritaka Miyamoto, Toyota (JP); Tomonari Kogure, Toyota (JP); Keiu Kanada, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 16/694,251

(22) Filed: Nov. 25, 2019

(65) Prior Publication Data
US 2020/0195112 A1 Jun. 18, 2020

(30) Foreign Application Priority Data
Dec. 14, 2018 (JP) .............................. JP2018-234737

(51) Int. Cl.
H02K 24/00 (2006.01)
H02K 11/21 (2016.01)

(52) U.S. Cl.
CPC ............ *H02K 24/00* (2013.01); *H02K 11/21* (2016.01)

(58) Field of Classification Search
CPC .......... H02K 1/02; H02K 24/00; H02K 11/21; H02K 2201/03
See application file for complete search history.

(56) References Cited

U.S. PATENT DOCUMENTS

| 5,215,385 A * | 6/1993 | Ide ........................ | F16C 27/02 384/100 |
| 2003/0113465 A1* | 6/2003 | Baumann ................ | H02K 3/30 427/425 |
| 2006/0245956 A1* | 11/2006 | Lacroix ................ | H02K 5/1282 417/423.1 |
| 2008/0258585 A1* | 10/2008 | Kataoka ................ | G01P 3/488 310/68 B |
| 2009/0174280 A1* | 7/2009 | Prudham ................ | H02K 29/03 310/216.022 |
| 2010/0255292 A1* | 10/2010 | Shintani .................. | H02K 1/02 428/335 |
| 2013/0309481 A1* | 11/2013 | Kasagi .................. | H01B 3/301 428/304.4 |

(Continued)

FOREIGN PATENT DOCUMENTS

JP 2018-004382 A 1/2018
JP 2018-036215 A 3/2018

*Primary Examiner* — Naishadh N Desai
(74) *Attorney, Agent, or Firm* — Sughrue Mion, PLLC

(57) ABSTRACT

A resolver that ensures improvement in a detection sensitivity is provided. The resolver according to the present disclosure includes a rotor and a stator arranged to surround an outer peripheral surface of the rotor. The rotor includes a rotor core, the stator includes a stator core and a coil, the stator core includes a plurality of teeth disposed at intervals along a circumferential direction, the plurality of teeth project toward the outer peripheral surface side of the rotor, and the coil is wound around the plurality of teeth. A gap permeance between the rotor and the stator varies in association with a rotation around a rotation axis of the rotor. The rotor further includes a porous machinable film containing a magnetic metal, and the porous machinable film is disposed on a projecting portion on an outer peripheral surface of the rotor core.

5 Claims, 12 Drawing Sheets

(56) References Cited

U.S. PATENT DOCUMENTS

| | | | |
|---|---|---|---|
| 2014/0230593 A1* | 8/2014 | Takagi | B60K 6/405 |
| | | | 74/468 |
| 2016/0308409 A1* | 10/2016 | Takahashi | H02K 21/46 |
| 2017/0199057 A1* | 7/2017 | Morita | G01D 5/2066 |
| 2018/0316253 A1* | 11/2018 | Lee | G01D 5/20 |
| 2019/0036429 A1* | 1/2019 | Wang | B23K 11/115 |
| 2019/0070798 A1* | 3/2019 | Ma | B29C 70/36 |

* cited by examiner

RESOLVER

CROSS REFERENCE TO RELATED APPLICATIONS

The present application claims priority from Japanese patent application JP 2018-234737 filed on Dec. 14, 2018, the content of which is hereby incorporated by reference into this application.

BACKGROUND

Technical Field

The present disclosure relates to a resolver at detects a rotation angle of a rotating electrical machine.

Description of Related Art

A resolver is provided for a rotating electrical machine such as a motor to detect its rotation angle. As the resolver, the following resolver has been known. The resolver includes a rotor, which is mounted on a rotating part such as a shaft included in the rotating electrical machine and rotates in accordance with a rotation of the rotating part, and a stator, which is arranged to have an interval in a radial direction with the rotor. The resolver has a gap permeance between the rotor and the stator that varies in association with a rotation around a rotation axis of the rotor.

As this type of resolver, for example, JP 2018-004382 A discloses a resolver that includes a rotor, which has an oval shape when viewed in an axial direction of a rotation shaft, and an annular stator, which is arranged to surround an outer periphery of the rotor to have an interval in a radial direction with the rotor. An outer peripheral side of the rotor is plated with a magnetic material.

JP 2018-036215 A discloses a resolver that includes a rotor, which has a corrugated outer periphery, and a stator, which is arranged to have an interval in a radial direction with the rotor.

SUMMARY

The resolvers as described above are desired to improve detection sensitivity. When the interval between the rotor and the stator can be decreased, a magnetic reluctance can be decreased, thus improving the detection sensitivity. However, the interval between the rotor and the stator is required to ensure a length equal to or more than a certain length considering a tolerance such as a product tolerance and an assembly tolerance.

In the resolver disclosed in JP 2018-004382 A, when the interval between the rotor and the stator is attempted to be decreased without ensuring the length equal to or more than the certain length, since the outer peripheral side of the rotor is plated, the rotor contacts the stator in the rotation of the rotor to possibly cause the rotor to stop by getting caught on the stator or damage the rotor and the stator. The resolver disclosed in JP 2018-036215 A has similar possibility since the rotor is formed of a metal plate or the like.

Accordingly, it has been desired that the detection sensitivity of the resolver is further improved by decreasing the interval between the rotor and the stator compared with conventional one without causing such a problem.

The present disclosure has been made in view of such an aspect, and provides a resolver that ensures improvement in a detection sensitivity.

To solve the above-described problem, a resolver according to the present disclosure includes a rotor and a stator arranged to surround an outer peripheral surface of the rotor. The rotor includes a rotor core, the stator includes a stator core and a coil, the stator core includes a plurality of teeth disposed at intervals along a circumferential direction, the plurality of teeth project toward the outer peripheral surface side of the rotor, and the coil is wound around the plurality of teeth. The resolver is configured so that a gap permeance between the rotor and the stator varies in association with a rotation around a rotation axis of the rotor. The rotor further includes a porous machinable film containing a magnetic metal, and the porous machinable film is disposed on a projecting portion on an outer peripheral surface of the rotor core.

Effect

The present disclosure ensures the improvement in the detection sensitivity.

DETAILED DESCRIPTION OF THE EMBODIMENTS

The following describes an embodiment of a resolver according to the present disclosure.

A resolver according to the embodiment includes a rotor and a stator arranged to surround an outer peripheral surface of the rotor. The rotor includes a rotor core, the stator includes a stator core and a coil, the stator core includes a plurality of teeth disposed at intervals along a circumferential direction, the plurality of teeth project toward the outer peripheral surface side of the rotor, and the coil is wound around the plurality of teeth. The resolver is configured so that a gap permeance between the rotor and the stator varies in association with a rotation around a rotation axis of the rotor. The rotor further includes a porous machinable film containing a magnetic metal, and the porous machinable film is disposed on a projecting portion on an outer peripheral surface of the rotor core.

Figure 1:
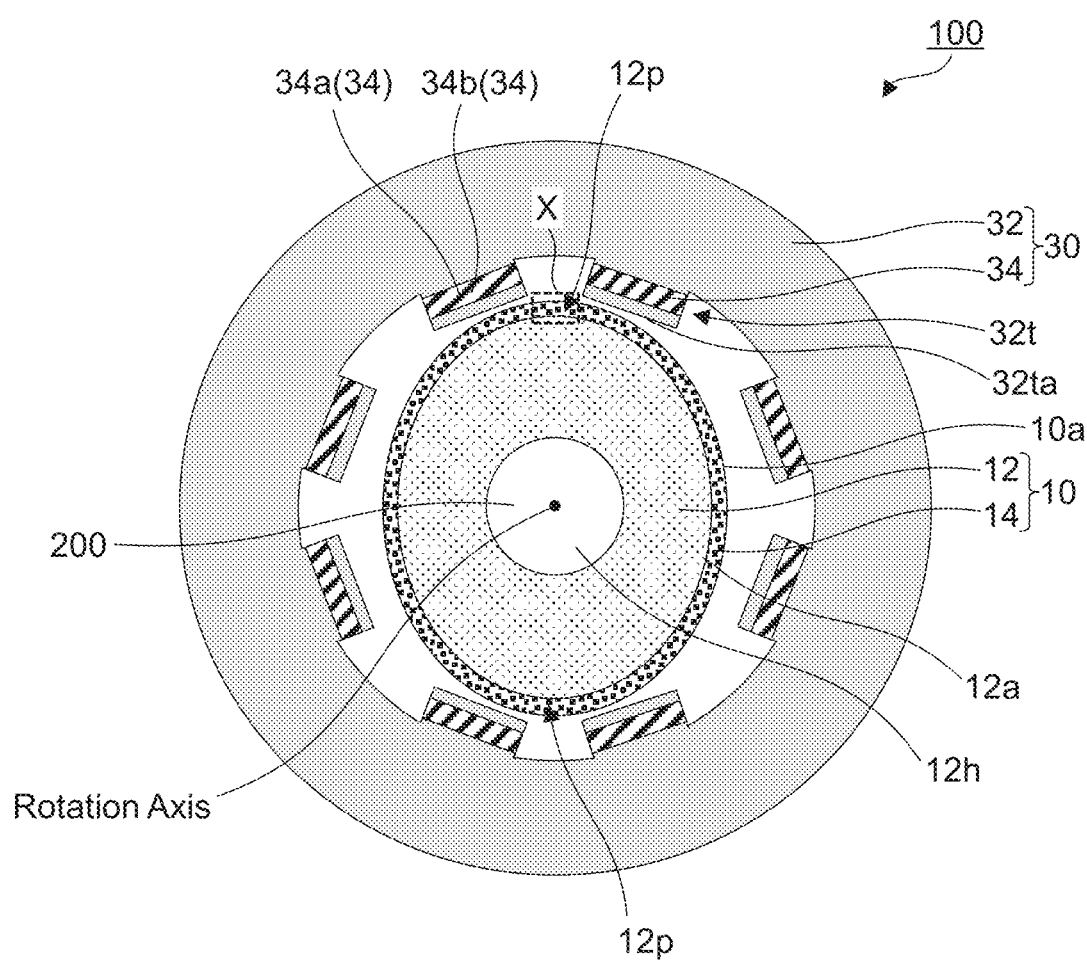
FIG. 1 is a schematic plan view illustrating an exemplary resolver according to an embodiment.
Figure 2:
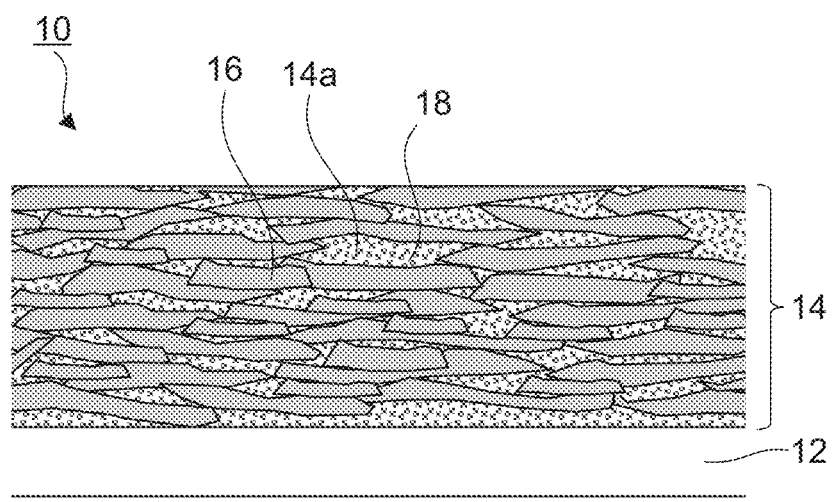
FIG. 2 is an enlarged view of a part X in FIG. 1.
Figure 3:
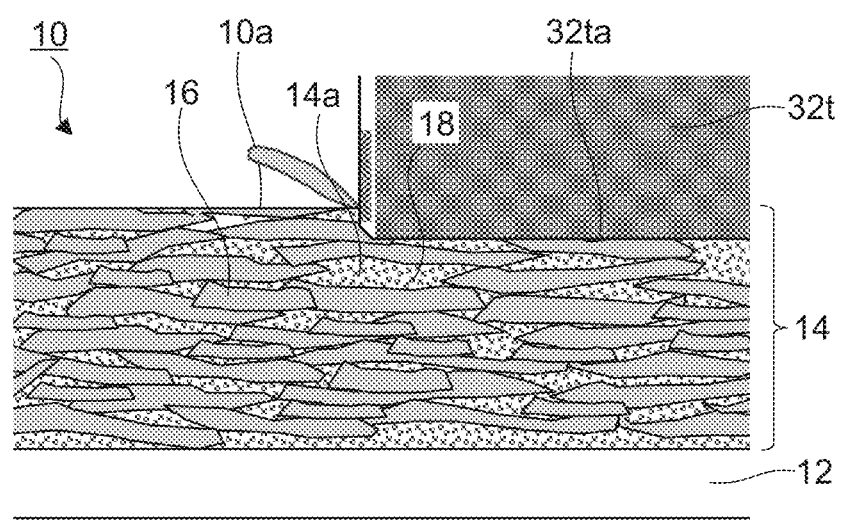
FIG. 3 is a schematic diagram schematically illustrating a state where teeth of a stator core contact an outer peripheral surface of a rotor.

First, an outline of the resolver according to the embodiment will be described with exemplifying it in the drawings. Here, FIG. 1 is a schematic plan view illustrating an exemplary resolver according to the embodiment. FIG. 2 is an enlarged view of a part X in FIG. 1. FIG. 3 is a schematic diagram schematically illustrating a state where teeth of a stator core contact an outer peripheral surface of a rotor.

As illustrated in FIG. 1, a resolver 100 in this example, which is a radial-gap-type resolver including a rotor 10 and an annular stator 30 arranged to surround an outer peripheral surface 10a of the rotor 10, detects a rotation angle of a motor (not illustrated). The rotor 10 is mounted on a shaft 200 included in the motor. The stator 30 is fixed to a housing (not illustrated) of the motor. The rotor 10 rotates around a rotation axis with respect to the stator 30 in accordance with a rotation of the shaft 200 of the motor. The rotor 10 has a center that matches the rotation axis.

As illustrated in FIG. 1, the rotor 10 includes a rotor core 12 and a porous machinable film 14. The rotor core 12 has an outer peripheral surface 12a having an oval shape in plan view from an axial direction of the rotation axis. The porous machinable film 14 is disposed on a whole including a projecting portion 12p of the outer peripheral surface 12a of the rotor core 12. The rotor core 12, which is made of aluminum, has a through-hole 12h into which the shaft 200 of the motor is inserted. This through-hole 12h has a center that matches the rotation axis of the rotor 10.

As illustrated in FIG. 2, the porous machinable film 14 is a thermal spray film containing a plurality of magnetic metal particles 16 that are fused to one another and gaps 14a between the magnetic metal particles 16, and has an area ratio of the magnetic metal particles 16 in a range of 40% to 80%. The porous machinable film 14 further contains solid lubricant particles 18. In the porous machinable film 14, the gaps 14a between the magnetic metal particles 16 are filled with the solid lubricant particles 18.

As illustrated in FIG. 1, the stator 30 includes an annular stator core 32 and a coil 34. The stator core 32 is a laminated body where a plurality of core pieces obtained by punching an electromagnetic steel plate are laminated. The stator core 32 has an inner peripheral side on which a plurality of teeth 32t projecting toward the outer peripheral surface 10a side of the rotor 10 are disposed at intervals along a circumferential direction. The coil 34 is wound around the plurality of teeth 32t and includes an excitation coil 34a and a detection coil 34b.

In the resolver 100, the stator 30 is arranged such that distal end surfaces 32ta of the plurality of teeth 32t of the stator core 32 have an interval with the outer peripheral surface 10a of the rotor 10, and the rotor 10 is arranged rotatable around the rotation axis. The resolver 100 is configured so that a gap permeance between the rotor 10 and the stator 30 periodically varies by periodically varying the interval between the outer peripheral surface 10a of the rotor 10 and the distal end surfaces 32ta of the plurality of teeth 32t of the stator core 32 in association with the rotation around the rotation axis of the rotor 10.

In the resolver 100, in a state where the teeth 32t have been excited by receiving an excitation signal at the excitation coil 34a, when the shaft 200 of the motor rotates, the detection coil 34b outputs a detection signal corresponding to the periodical variation of the gap permeance between the rotor 10 and the stator 30 in association with the rotation around the rotation axis of the rotor 10. Thus, the rotation angle of the motor is detected from a voltage change of this detection signal.

In this example, the rotor 10 includes the porous machinable film 14 disposed on the whole including the projecting portion 12p of the outer peripheral surface 12a of the rotor core 12. The porous machinable film 14 is one that contains the plurality of magnetic metal particles 16 and the gaps 14a between the magnetic metal particles 16, and has the area ratio of the magnetic metal particles 16 in a range of 40% to 80%. Accordingly, as illustrated in FIG. 3, even when the teeth 32t of the stator core 32 contact the outer peripheral surface 10a of the rotor 10 in association with the rotation around the rotation axis of the rotor 10, the porous machinable film 14 will be cut or depressed. At this time, a breakage of the porous machinable film 14 due to, for example, drop-off of a part including a contact portion is prevented. This can continue the rotation of the rotor 10 after adjusting the interval between the outer peripheral surface 10a of the rotor 10 and the distal end surfaces 32ta of the teeth 32t to an optimal distance without damaging the rotor 10 and the stator 30. Accordingly, the interval between the outer peripheral surface 10a of the rotor 10 and the distal end surfaces 32ta of the teeth 32t of the stator core 32 can be set smaller than that of the conventional one. This can decrease a magnetic reluctance of the resolver 100 to improve a detection sensitivity. Even when the resolver 100 have individual product differences in dimension, cutting or depressing the porous machinable film 14 can adjust the interval between the outer peripheral surface 10a of the rotor 10 and the distal end surfaces 32ta of the teeth 32t to the optimal distance for each product.

According to the embodiment, as the above-described example, the rotor includes the porous machinable film containing the magnetic metal disposed on the projecting portion on the outer peripheral surface of the rotor core. Thus, even when the stator contacts the outer peripheral surface of the rotor, the porous machinable film will be cut or depressed. At this time, the breakage of the porous machinable film is prevented. This can continue the rotation of the rotor after adjusting the interval between the outer peripheral surface of the rotor and the distal end surfaces of the teeth to an optimal distance without damaging the rotor and the stator. Accordingly, the interval between the outer peripheral surface of the rotor and the distal end surfaces of the teeth of the stator core can be set smaller than that of the conventional one. This can decrease the magnetic reluctance to improve the detection sensitivity. Even when there is the individual difference in dimension by product, the interval between the outer peripheral surface of the rotor and the distal end surfaces of the teeth can be adjusted to the optimal distance for each product.

The following describes a configuration of the resolver according to the embodiment in detail.

1. Rotor

The rotor is one that is arranged rotatable around the rotation axis inside the stator and includes the rotor core and the porous machinable film containing the magnetic metal. The porous machinable film is disposed on the projecting portion on the outer peripheral surface of the rotor core.

Here, "the projecting portion on the outer peripheral surface of the rotor core" means a part having a short interval with the distal end surfaces of the teeth of the stator core, on the outer peripheral surface of the rotor, when the rotor rotates around the rotation axis, for example, such as the projecting portion 12p illustrated in FIG. 1.

(1) Porous Machinable Film

The porous machinable film is one that is a porous film that contains the magnetic metals and the gaps between the magnetic metals, and has machinability.

The porous machinable film is not specifically limited insofar as the film as described above and can be roughly divided into a thermal spray film and a cold spray film. The following describe each of the thermal spray film and the cold spray film.

(1-1) Thermal Spray Film

The thermal spray film is a porous machinable film formed by thermal spraying.

a. Thermal Spray Film

The thermal spray film is not specifically limited insofar as the one as described above but may be one having the area ratio of the magnetic metal in a range of 40% to 80%, such as the thermal spray film (the porous machinable film) 14 illustrated in FIG. 1. This is because, when the area ratio of the magnetic metal is 40% or more, the thermal spray film does not become brittle, thus ensuring the suppression in breakage of the thermal spray film due to, for example, the drop-off of the part including the contact portion with which the stator is in contact. This is also because, when the area ratio of the magnetic metal is 80% or less, a satisfactory machinability is obtained, thus ensuring suppression in abrasion of the stator and adhesion to the thermal spray film of the stator by surely cutting or depressing the thermal spray film even when the stator contacts the thermal spray film.

Here, "the area ratio of the magnetic metal" means a ratio of an area occupied by the magnetic metal to the whole area of an observation area in a cross section of the porous machinable film expressed as a percentage (%) and means, for example, a ratio of an area occupied by the magnetic metal to the whole area of an observation area in a cross section along a thickness direction of the porous machinable film.

The thermal spray film may have the area ratio of the magnetic metal in a range of 50% to 80%. This is because the increased volume ratio of the magnetic metal can increase a magnetic permeability of the thermal spray film.

The magnetic metal is not specifically limited but may be a soft magnetic metal. The soft magnetic metal includes, for example, iron, nickel, a ferrous alloy, a nickel alloy, and an iron-nickel alloy. The ferrous alloy is not specifically limited but includes, for example, Fe-3Si.

The thermal spray film may further contain the solid lubricant, such as the thermal spray film (the porous machinable film) 14 illustrated in FIG. 1. The film formation by thermal-spraying a thermal spray powder that further contains the solid lubricant particles can suppress cohesion of the magnetic metal particles. This is because the area ratio of the magnetic metal is easily decreased to easily make the thermal spray film a porous machinable film having a high machinability. This is also because the adhesion to the thermal spray film of the stator can be suppressed.

The solid lubricant is not specifically limited but includes one containing one kind or two kinds or more selected from, for example, hexagonal boron nitride (h-BN), graphite (C), and resins such as polytetrafluoroethylene (PTFE), molybdenum disulfide ($MoS_2$), and tungsten disulfide ($WS_2$), and may include one containing one kind or two kinds or more selected from the hexagonal boron nitride, the graphite, and the resins such as the polytetrafluoroethylene. This is because its lubricity is high.

A contained amount of the solid lubricant with respect to the whole thermal spray film is not specifically limited but may be, for example, in a range of 2 mass % to 6 mass % or in a range of 3 mass % to 4.5 mass % in some embodiments. This is because the area ratio of the magnetic metal in the thermal spray film easily enters a desired range.

The thermal spray film may further contain aluminum (Al) in addition to the solid lubricant. This is because the solid lubricant is likely to remain in the thermal spray film.

A contained amount of the aluminum with respect to the whole thermal spray film is not specifically limited but may be, for example, in a range of 3 mass % to 5 mass %. This is because, when the contained amount of the aluminum is 3 mass % or more, an effect that the solid lubricant is likely to remain in the thermal spray film can be expected. This is also because, when the contained amount of the aluminum is 5 mass % or less, reduction in machinability of the thermal spray film can be suppressed. The respective contained amounts of the magnetic metal, the solid lubricant, and the aluminum with respect to the whole thermal spray film are assumed to be calculated without considering a contained amount of a binder such as a resin applied at the time of granulation of the thermal spray powder, which will be described later. The contained amount of the magnetic metal with respect to the whole thermal spray film may be considered as a contained amount of a balance other than the solid lubricant and the aluminum.

A thickness of the thermal spray film is not specifically limited but may be, for example, in a range of 0.1 mm to 1.0 mm, in a range of 0.2 mm to 1.0 mm, or in a range of 0.5 mm to 1.0 mm in some embodiments. This is because the thickness of the thermal spray film being a lower limit or more of these ranges can decrease the magnetic reluctance of the resolver compared with a case using the plating using a magnetic material instead of the thermal spray film. The thickness of the thermal spray film being an upper limit or less of these ranges facilitates formation of the thermal spray film. The thickness of the thermal spray film is usually made uniform.

b. Film Forming Method for Thermal Spray Film

The thermal spray film is formed by thermal-spraying the thermal spray powder to the outer peripheral surface of the rotor core.

The thermal spray powder is a powder containing the magnetic metal particles. The magnetic metal particle is a particle including the magnetic metal contained in the thermal spray film.

The thermal spray powder is not specifically limited insofar as such a powder but may be a powder that further contains the solid lubricant particles in addition to the magnetic metal particles. This is because the thermal spray film is easily made the porous machinable film and the area ratio of the magnetic metal is easily decreased. This is also because the adhesion to the thermal spray film of the stator can be suppressed. The solid lubricant particle is a particle including the solid lubricant contained in the thermal spray film.

Figure 4:
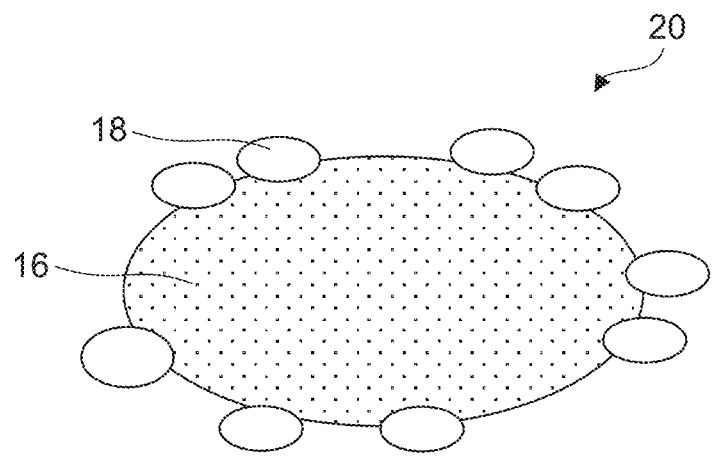
FIG. 4 is a schematic diagram illustrating a granulated particle of a thermal spray powder.

The thermal spray powder is, for example, a granulated powder granulated by mixing a powder containing the magnetic metal particles with a powder containing the solid lubricant particles. This granulated powder is a powder including the granulated particles such as particles 20 granulated from the magnetic metal particle 16 and the solid lubricant particles 18 with the binder such as the resin, as illustrated in FIG. 4. The thermal spray powder may be a powder obtained by mixing the magnetic metal particles and the solid lubricant particles, insofar as the powder can be thermal-sprayed to the outer peripheral surface of the rotor core in a state where the magnetic metal particles and the solid lubricant particles have been mixed. The thermal spray powder may be one obtained by powder compression molding in a cladding method or the like, instead of the granulated powder. In the thermal spray powder, the whole surface of the magnetic metal particle may be coated with the solid lubricant particles.

A contained amount of the solid lubricant particles with respect to the whole thermal spray powder is similar to the contained amount of the solid lubricant with respect to the whole thermal spray film, thus the description is omitted here.

A grain diameter of the magnetic metal particle is not specifically limited but may be, for example, in a range of 38 µm to 150 µm or in a range of 45 µm to 125 µm in some embodiments. A grain diameter of the solid lubricant particle is not specifically limited but may be, for example, in a range of 3 µm to 30 µm or in a range of 3 µm to 10 µm in some embodiments. This is because the whole surface of the magnetic metal particle can be more uniformly coated with the solid lubricant particles of the above-described contained amount.

Here, "the grain diameter" is a grain diameter measured in a laser-diffraction-type particle size distribution measurement method. Such a grain diameter can be obtained by, for example, a classification compliant to Japanese industrial Standard Z 2510. When the whole surface of the magnetic metal particle is coated with the solid lubricant particles, the grain diameter of the solid lubricant particle is smaller than the grain diameter of the magnetic metal particle.

The thermal spray powder may further contain aluminum particles (Al particles) as particles including the aluminum in addition to the solid lubricant particles. The aluminum has a high wettability with respect to both of the magnetic metal and the solid lubricant, thus ensuring suppression of separation of the magnetic metal particles and the solid lubricant particles by the aluminum particles at the time of the formation of the thermal spray film. Accordingly, the solid lubricant is likely to remain in the thermal spray film.

A contained amount of the aluminum particles with respect to the whole thermal spray powder is similar to the contained amount of the aluminum with respect to the whole thermal spray film, thus the description is omitted here. A grain diameter of the aluminum particle is not specifically limited insofar as a thermal spray film having desired characteristics can be formed, but may be, for example, in a range of 3 µm to 30 µm. The respective contained amounts of the magnetic metal particles, the solid lubricant particles, and the aluminum particles with respect to the whole thermal spray film are assumed to be calculated without considering a contained amount of the binder such as the resin added at the time of the granulation of the thermal spray powder. The contained amount of the magnetic metal particles with respect to the whole thermal spray powder may be considered as a contained amount of a balance other than the solid lubricant particles and the aluminum particles.

The aluminum particles are combined with the magnetic metal particles and the solid lubricant particles via the binder when the thermal spray powder is granulated. When the thermal spray powder is thermal-sprayed, insofar as the thermal spray powder can be thermal-sprayed to the outer peripheral surface of the rotor core in a state where the aluminum particles are uniformly mixed with the magnetic metal particles and the solid lubricant particles, the thermal spray powder may be a powder obtained by mixing the magnetic metal particles, the solid lubricant particles, and the aluminum particles. The thermal spray powder may be one obtained by powder compression molding in the cladding method or the like, instead of the granulated powder.

A thermal spraying method for the thermal spray powder is not specifically limited insofar as the thermal spray film can be formed, but includes, for example, a gas flame spraying method and a plasma spraying method. The thermal spraying method for the thermal spray powder may be the gas flame spraying method in some embodiments. This is because compared with another thermal spraying method such as the plasma spraying method, the thermal spray powder can be thermal-sprayed at low temperature. Thereby, the more solid lubricant can be interposed between the magnetic metal particles at the time of the formation of the thermal spray film to reduce metallic bonding of the magnetic metal particles, thus improving the machinability of the thermal spray film.

(1-2) Cold Spray Film

The cold spray film is a porous machinable film formed by a cold spray method.

a. Cold Spray Film

The cold spray film is not specifically limited insofar as one as described above but may have the area ratio of the magnetic metal in a range of 40% to 80% or the area ratio of the magnetic metal in a range of 50% to 80% in some embodiments. This is from a reason similar to that of the thermal spray film.

The magnetic metal is similar to the magnetic metal contained in the thermal spray film, thus the description is omitted here.

The cold spray film may be one that further contains the solid lubricant. This is because this can suppress the cohesion of the magnetic metal particles. Thereby, the cold spray film is easily made the porous machinable film and the area ratio of the magnetic metal is easily decreased. This is also because the adhesion to the cold spray film of the stator can be suppressed. The solid lubricant is usually one filled in the gaps between the magnetic metal particles in the cold spray film.

The solid lubricant is similar to the solid lubricant contained in the thermal spray film, thus the description is omitted here. A contained amount of the solid lubricant with respect to the whole cold spray film is similar to the contained amount of the solid lubricant with respect to the whole thermal spray film, thus the description is omitted here.

The cold spray film may further contain the aluminum in addition to the solid lubricant similarly to the thermal spray film. A contained amount of the aluminum with respect to the whole cold spray film is similar to the contained amount of the aluminum with respect to the whole thermal spray film, thus the description is omitted here. A contained amount of the magnetic metal with respect to the whole cold spray film may be considered as a contained amount of a balance other than the solid lubricant and the aluminum.

A thickness of the cold spray film is similar to the thickness of the thermal spray film, thus the description is omitted here.

The cold spray film is formed by depositing the magnetic metal particles in a solid phase state without melting them unlike the thermal spray film, thus being a film where the magnetic metal particles are not fused to one another. Accordingly, the cold spray film has a machinability higher than that of the thermal spray film.

b. Film Forming Method for Cold Spray Film

The cold spray film is formed by spraying a spray powder in the solid phase state without melting it to be attached to and deposited on the outer peripheral surface of the rotor core, for example, using a compressed gas in the cold spray method.

The spray powder is a powder containing the magnetic metal particles. The magnetic metal particle is a particle including the magnetic metal contained in the cold spray film.

The spray powder is not specifically limited insofar as the powder as described above but includes, for example, a powder granulated from a powder for a granulation. The powder for a granulation includes, for example, a gas atomized powder, a water atomized powder, and an electrolytic powder but may be the electrolytic powder in some embodiments. Compared with another powder for a granulation, the electrolytic powder has a shape having many unevennesses to have a space on its surface, thus having a high attachment efficiency. From such a reason, as the spray powder, an electrolytic powder without the granulation may be directly used.

A grain diameter of the magnetic metal particle contained in the spray powder is similar to the grain diameter of the magnetic metal particle contained in the thermal spray powder, thus the description is omitted here.

The spray powder may be a powder that further contains the solid lubricant particles in addition to the magnetic metal particles. This is because the cohesion of the magnetic metal particles in the cold spray film can be suppressed. The solid lubricant particle is a particle including the solid lubricant contained in the cold spray film.

A contained amount of the solid lubricant particles with respect to the whole spray powder is similar to the contained amount of the solid lubricant of the cold spray film, thus the description is omitted here. A grain diameter of the solid lubricant particle contained in the spray powder is similar to the grain diameter of the solid lubricant particle contained in the thermal spray powder, thus the description is omitted here.

The spray powder may further contain the aluminum particles in addition to the magnetic metal particles and the solid lubricant particles. This is from a reason similar to that of the thermal spray powder.

A contained amount of the aluminum particles with respect to the whole spray powder is similar to the contained amount of the aluminum with respect to the whole cold spray film, thus the description is omitted here. A grain diameter of the aluminum particles contained in the spray powder is similar to the grain diameter of the aluminum particles contained in the thermal spray powder, thus the description is omitted here. A contained amount of the magnetic metal particles with respect to the whole spray powder may be considered as a contained amount of a balance other than the solid lubricant particles and the aluminum particles.

The compressed gas is not specifically limited and can be appropriately selected to form a desired cold spray film. For example, using one having a high pressure can increase an adhesion of the magnetic metal particles to increase the area ratio of the magnetic metal in the cold spray film, and using one having a low pressure can decrease the adhesion of the magnetic metal particles to decrease the area ratio of the magnetic metal in the cold spray film.

A type of the compressed gas is not specifically limited insofar as one that can form the desired cold spray film, but includes, for example, an inert gas such as a nitrogen gas or a helium gas, or air.

Another condition at the time of the film formation such as a temperature of the spray powder sprayed to the outer peripheral surface of the rotor core is also not specifically limited and can be appropriately selected to form the desired cold spray film.

(2) Rotor Core

A material of the rotor core is not specifically limited and may be a magnetic material or a non-magnetic material. When the material of the rotor core is the non-magnetic material, a weight of the resolver can be reduced using a lightweight material such as the resin. The magnetic material may be, for example, a soft magnetic material. The soft magnetic material includes, for example, an electromagnetic steel plate. The non-magnetic material includes, for example, the resin, the aluminum, and magnesium.

The rotor core is not specifically limited and may be a single plate-shaped member or a laminated body where a plurality of thin plates or core pieces, which are obtained by punching a thin film, are laminated.

A shape of the outer peripheral surface of the rotor core is not specifically limited insofar as one that constitutes the resolver such that the gap permeance between the rotor and the stator varies in association with the rotation around the rotation axis of the rotor, and may be, for example, a shape where the interval between the outer peripheral surface of the rotor and the distal end surfaces of the teeth of the stator core periodically varies in association with the rotation around the rotation axis of the rotor. The shape of the outer peripheral surface of the rotor core can be, for example, a non-circular shape such as an oval shape when the center of the rotor core is matched to the rotation axis. The shape of the outer peripheral surface of the rotor core can be a circular shape when the center of the rotor core is shifted from the rotation axis. Here, "the shape of the outer peripheral surface of the rotor core" means a shape of the outer peripheral surface of the rotor core when the rotor is viewed in plan view from the axial direction of the rotation axis.

A diameter of the rotor core is not specifically limited and may be a general diameter. A thickness of the rotor core is not specifically limited and may be a general thickness. Usually, the through-hole into which the rotating part such as the shaft included in the rotating electrical machine such as the motor is inserted is provided on the rotor core as illustrated in FIG. 1.

(3) Rotor

The rotor is not specifically limited insofar as one that constitutes the resolver such that the gap permeance between the rotor and the stator varies in association with the rotation around the rotation axis of the rotor, but may be, for example, one obtained by matching the center of the rotor core to the rotation axis and making the shape of the outer peripheral surface of the rotor core into the non-circular shape or one obtained by shifting the center of the rotor core from the rotation axis and making the shape of the outer peripheral surface of the rotor core into the circular shape.

The rotor is not specifically limited insofar as one where the porous machinable film is disposed on the projecting portion on the outer peripheral surface of the rotor core, and may be one where the porous machinable film is disposed on the whole outer peripheral surface of the rotor core or one where the porous machinable film is disposed on a part of the outer peripheral surface of the rotor core.

2. Stator

The stator is one that is arranged to surround the outer peripheral surface of the rotor and includes the stator core on which the plurality of teeth projecting toward the outer peripheral surface side of the rotor are disposed at intervals along the circumferential direction and the coil wound around the teeth.

A material of the stator core is not specifically limited insofar as the magnetic material but may be, for example, the soft magnetic material such as the electromagnetic steel plate. The stator core is not specifically limited and may be a single plate-shaped member or a laminated body where a plurality of thin plates or core pieces, which are obtained by punching a thin film, are laminated. The teeth of the stator core are not specifically limited and may be, for example, general teeth.

The coil is not specifically limited and usually one including the excitation coil that excites the teeth by receiving the excitation signal and the detection coil from which the detection signal corresponding to the above-described variation in the gap permeance is output. A winding method for the coil is also not specifically limited and may be, for example, a general winding method.

Figure 5A:
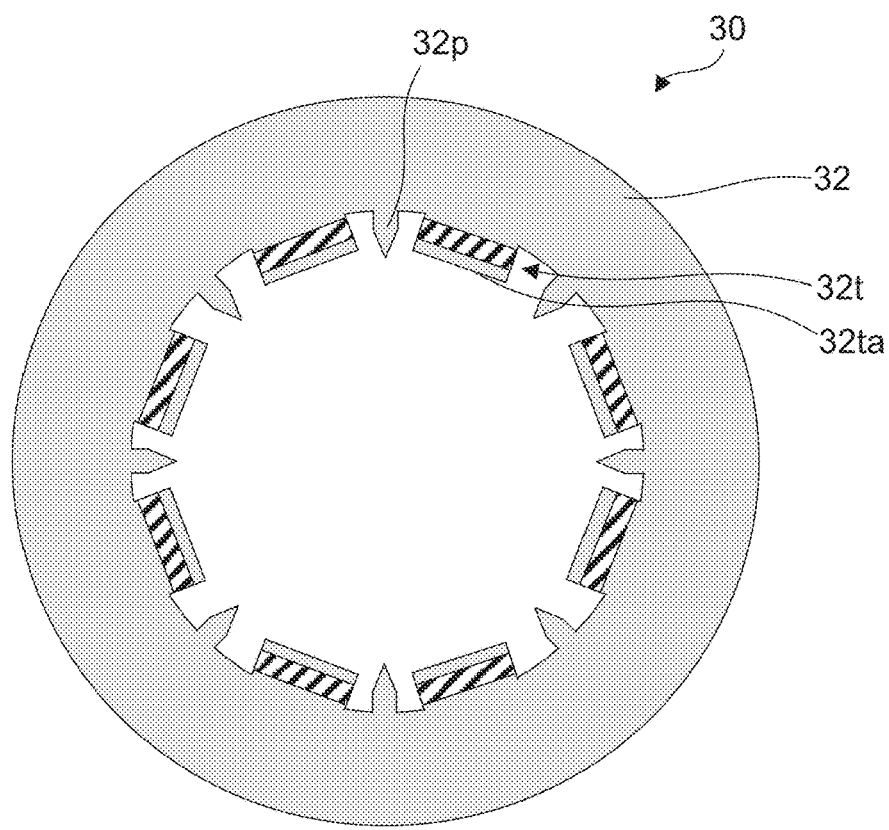
FIGS. 5A and 5B are schematic plan views illustrating stators in other examples of the resolver according to the embodiment.
Figure 5B:
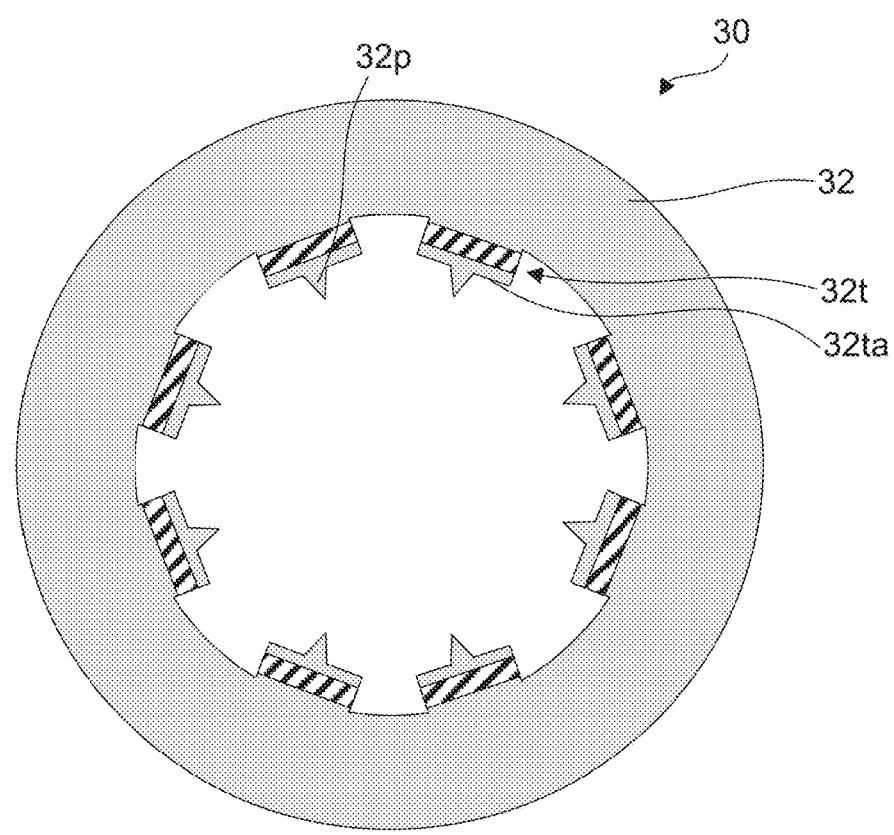

Here, each of FIG. 5A and FIG. 5B is a schematic plan view illustrating a stator in another example of the resolver according to the embodiment.

The stator 30 illustrated in FIG. 5A includes cutting protrusions 32p that project toward the outer peripheral surface side of the rotor with respect to the distal end surfaces 32ta of the teeth 32t, between the adjacent teeth 32t on the inner peripheral side of the stator core 32. The stator 30 illustrated in FIG. 5B includes the cutting protrusions 32p on the distal end surfaces 32ta of the plurality of teeth 32t in the stator core 32.

The stator is not specifically limited but may be one where the cutting protrusions that project toward the outer peripheral surface side of the rotor are disposed on the stator core as illustrated in FIG. 5A and FIG. 5B. This is because, when the stator contacts the outer peripheral surface of the rotor, the cutting protrusions can more easily cut the porous machinable film, thus effectively ensuring the suppression of the breakage of the thermal spray film, and the abrasion of the stator and the adhesion to the thermal spray film of the stator. The cutting protrusion has a distal end acuter than the teeth. The cutting protrusion may be one that projects toward the outer peripheral surface side of the rotor with respect to the teeth or one that projects toward the outer peripheral surface side of the rotor by the same amount as the teeth. The cutting protrusion is formed as a part of the stator core from the above-described plate-shaped member or laminated body.

3. Resolver

The resolver includes the rotor and the stator. The resolver is configured so that the gap permeance between the rotor and the stator that varies in association with the rotation around the rotation axis of the rotor.

The interval between the outer peripheral surface of the rotor and the distal end surfaces of the teeth of the stator core is not specifically limited but may be, for example, in a range of 1.0 mm or less, in a range of 0.5 mm or less, in a range of 0.2 mm or less, or in a range of 0.1 mm or less in some embodiments. This is because the decreased interval can decrease the magnetic reluctance of the resolver to improve detection sensitivity of the resolver.

Here, "the interval between the outer peripheral surface of the rotor and the distal end surfaces of the teeth of the stator core" means the shortest interval when the interval between the outer peripheral surface of the rotor and the distal end surfaces of the teeth of the stator core becomes shortest while the rotor is rotating around the rotation axis.

EXAMPLES

The following further describes the resolver according to the embodiment more specifically using Examples and Comparative Examples.

Figure 6A:
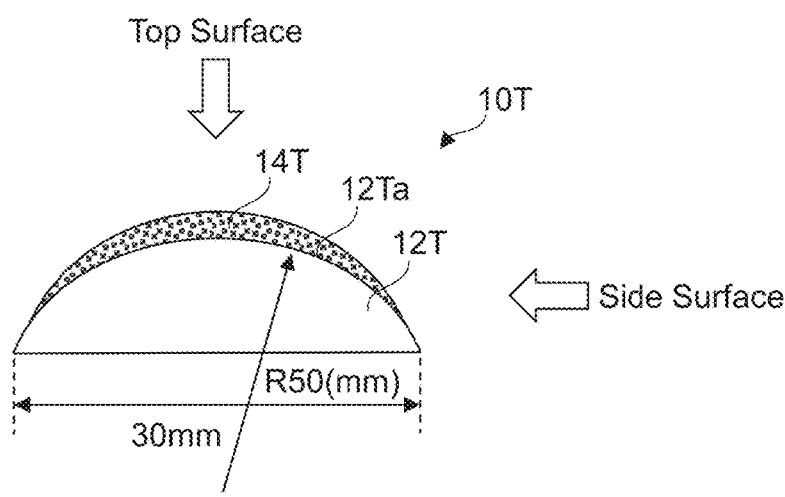
FIGS. 6A to 6C are schematic diagrams illustrating a thermal spray specimen manufactured in Examples and Comparative Examples.
Figure 6B:
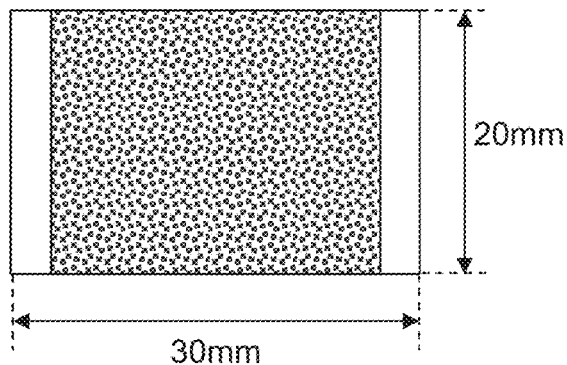
Figure 6C:
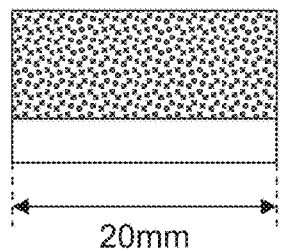

Here, FIG. 6A is a schematic cross-sectional view illustrating a thermal spray specimen manufactured in Examples and Comparative Examples. FIG. 6B is a schematic top view illustrating the thermal spray specimen illustrated in FIG. 6A. FIG. 6C is a schematic side view illustrating the thermal spray specimen illustrated in FIG. 6A.

Example 1

First, Fe-3Si particles having a grain diameter of 45 μm to 125 μm, h-BN particles (hexagonal boron nitride particles) having a grain diameter of 3 μm to 10 μm, and Al particles having a grain diameter of 20 μm or less were prepared. They were mixed to have configurations of the h-BN particles: 6.0 mass %, the Al particles: 4.0 mass %, and the Fe-3Si particles: the balance with respect to the whole thermal spray powder. The h-BN particles and the Al particles were attached to the Fe-3Si particles via a binder resin, thus manufacturing the thermal spray powder by the granulation.

Next, a semicylindrical specimen 12T having a width of 30 mm, a thickness of 20 mm, and an R50 (mm) including Al-12Si illustrated in FIGS. 6A to 6C was prepared. Subsequently, shot-blasting was performed on a surface 12Ta of the specimen 12T with a blast material having an average grain diameter of 350 μm.

Next, the thermal spray powder was thermal-sprayed to the surface 12Ta of the specimen 12T, thus manufacturing a thermal spray specimen 10T illustrated in FIGS. 6A to 6C where a thermal spray film 14T having the maximum film thickness of about 1 mm was formed on the surface 12Ta of the specimen 12T. Specifically, using a gas flame spraying device, the thermal spray powder was flame-sprayed to the surface 12Ta of the specimen 12T to form the thermal spray film 14T. A gas pressure of a gas supplied to a thermal spray gun had settings of an oxygen gas: 32 psi, a hydrogen gas (a fuel gas): 28 psi, and the air: 60 psi. A gas flow rate of the supply gas had settings of the oxygen gas: 32 NLPM, the hydrogen gas: 155.8 NLPM, and the air: 102.3 NLPM. A supply amount of the thermal spray powder supplied to the thermal spray gun at the time of the film formation was set at 90 g/minute. A distance from a distal end of the thermal spray gun to the specimen 12I was set at 230 mm. A moving speed of the thermal spray gun was set at 30 m/minute and a pitch was set at 6 mm.

Example 2

The mixture was performed to have configurations of the h-BN particles: 4.5 mass %, the Al particles: 4.0 mass %, and the Fe-3Si particles: the balance with respect to the whole thermal spray powder, thus manufacturing a thermal spray specimen similarly to Example 1 excluding the point that the thermal spray powder was manufactured.

Example 3

The mixture was performed to have configurations of the h-BN particles: 3.0 mass %, the Al particles: 4.0 mass %, and the Fe-3Si particles: the balance with respect to the whole thermal spray powder, thus manufacturing a thermal spray specimen similarly to Example 1 excluding the point that the thermal spray powder was manufactured.

Example 4

The mixture was performed to have configurations of the h-BN particles: 2.5 mass %, the Al particles: 4.0 mass %, and the Fe-3Si particles: the balance with respect to the whole thermal spray powder, thus manufacturing a thermal spray specimen similarly to Example 1 excluding the point that the thermal spray powder was manufactured.

Comparative Example 1

The mixture was performed to have configurations of the h-BN particles: 7.5 mass %, the Al particles: 4.0 mass %, and the Fe-3Si particles: the balance with respect to the whole thermal spray powder, thus manufacturing a thermal spray specimen similarly to Example 1 excluding the point that the thermal spray powder was manufactured.

Comparative Example 2

The mixture was performed to have configurations of the h-BN particles: 1.8 mass %, the Al particles: 4.0 mass %, and the Fe-3Si particles: the balance with respect to the whole thermal spray powder, thus manufacturing a thermal spray specimen similarly to Example 1 excluding the point that the thermal spray powder was manufactured.

Comparative Example 3

A thermal spray specimen was manufactured similarly to Example 1 excluding a point that a thermal spray powder including the Fe-3Si particles (the Fe-3Si particles: 100 mass %) alone was manufactured and a point that a thermal spray film having the maximum film thickness of about 1.25 mm was formed.

(SEM Observation)

Figure 7:
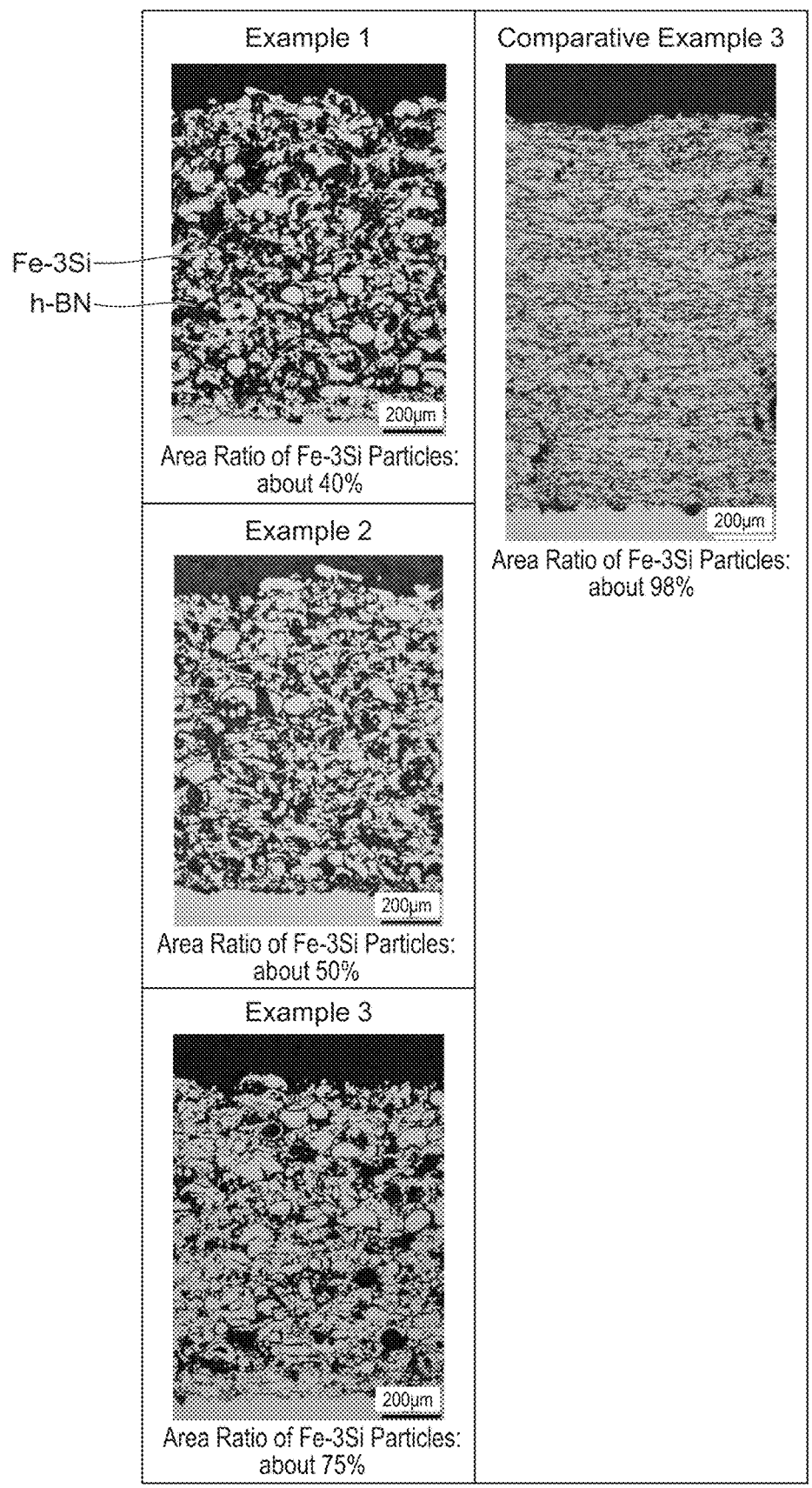
FIG. 7 includes SEM images of cross sections of thermal spray films in Examples 1 to 3 and Comparative Example 3.

Cross sections of the thermal spray films in the thermal spray specimens in Examples and Comparative Examples were observed with a scanning electron microscope (SEM). FIG. 7 includes SEM images of the cross sections of the thermal spray films in Examples 1 to 3 and Comparative Example 3. The area ratios of the Fe-3Si particles were also measured from the SEM images of the cross sections of the thermal spray films in Examples and Comparative Examples. In the following, Table 1 shows the area ratios of the Fe-3Si particles of the thermal spray films in Examples and Comparative Examples together with the contained amounts of the h-BN particles with respect to the whole thermal spray powder.

As illustrated in FIG. 7, the thermal spray films in Examples 1 to 3 are the porous machinable films having the gaps between the Fe-3Si particles. The larger the contained amount of the h-BN particles is, the smaller the area ratio of the Fe-3Si particles is and the larger the area ratio of the gaps between the Fe-3Si particles. The thermal spray films in Examples 1 to 3 are ones where the h-BN particles are filled in the gaps between the Fe-3Si particles. The thermal spray film in Comparative Example 3 is a film where the gaps hardly exist between the Fe-3Si particles.

(Vickers Hardness)

Figure 8:
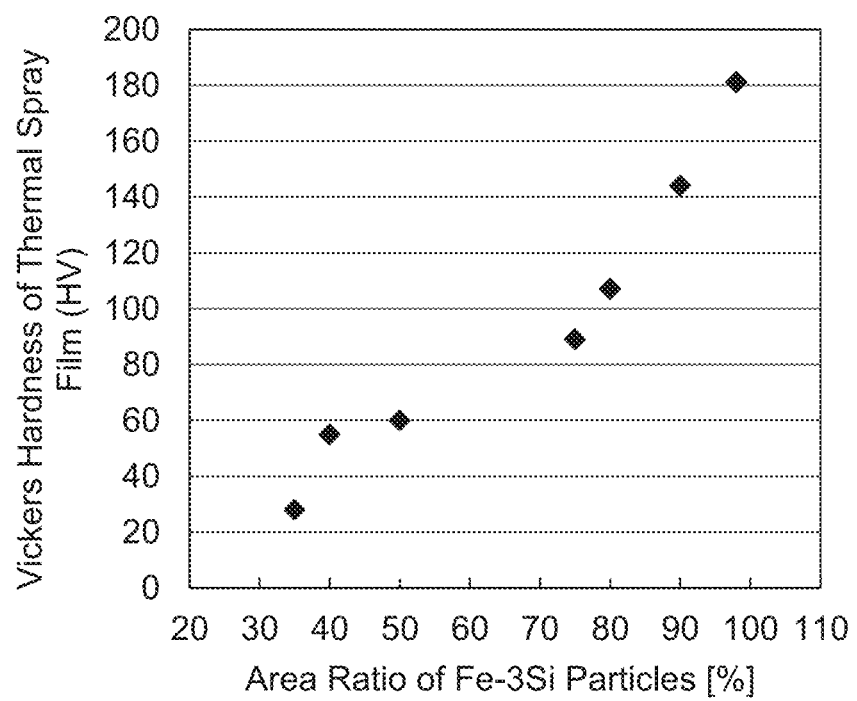
FIG. 8 is a graph illustrating a Vickers hardness of the thermal spray film with respect to an area ratio of Fe-3Si particles of the thermal spray film in Examples and Comparative Examples.

Vickers hardnesses of the thermal spray films in the thermal spray specimens in Examples and Comparative Examples were measured. Specifically, in a Vickers hardness test according to Japanese Industrial Standard Z 2244 (2009), the Vickers hardness of the thermal spray film when a test force is 0.01 kgf and a load holding period is ten seconds was measured. FIG. 8 is a graph illustrating the Vickers hardnesses of the thermal spray films with respect to the area ratios of the Fe-3Si particles of the thermal spray films in Examples and Comparative Examples.

As illustrated in FIG. 8, in the thermal spray films in Examples and Comparative Examples, the larger the area ratio of the Fe-3Si particles was, the larger the Vickers hardness was.

(Machinability Test)

Figure 9A:
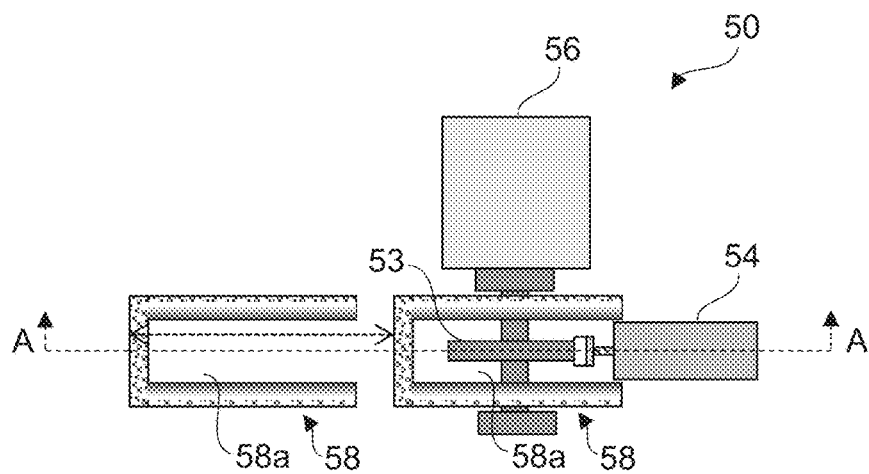
FIGS. 9A to 9C are schematic diagrams illustrating a machinability testing device.
Figure 9B:
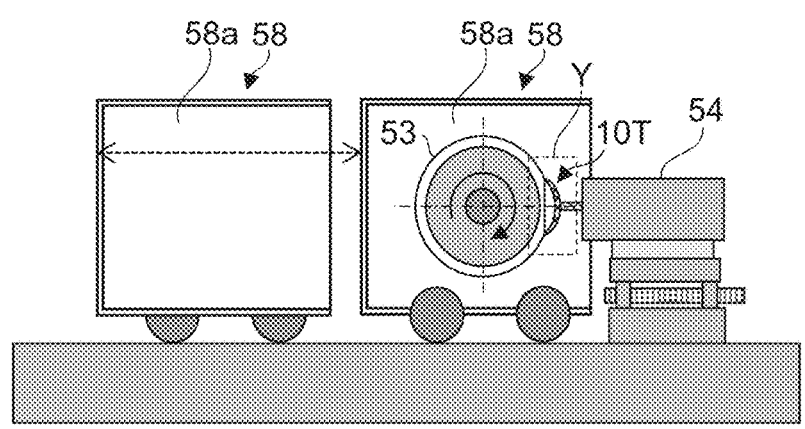
Figure 9C:
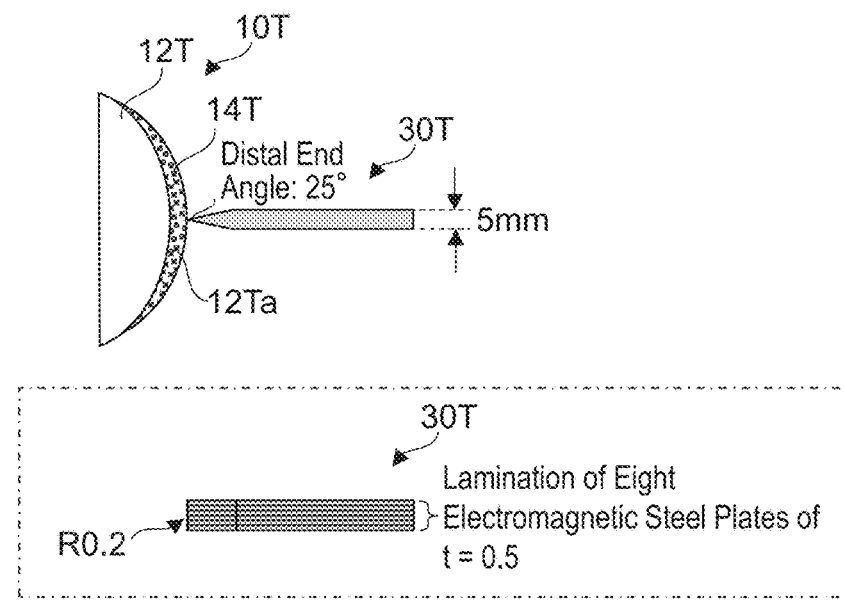

A machinability test was performed on the thermal spray specimens in Examples and Comparative Examples using a machinability testing device illustrated in FIGS. 9A to 9C. FIG. 9A is a schematic plan view illustrating the machinability testing device. FIG. 9B is a schematic cross-sectional view illustrating a cross section taken along a line A-A in FIG. 9A. FIG. 9C is an enlarged view of a part Y in FIG. 9B. FIG. 9C illustrates a plan view of a stator specimen illustrated in this drawing within a chain line frame.

In the machinability test, first, as illustrated in FIG. 9A and FIG. 9B, the thermal spray specimen 10T was mounted on a rotation rotor 53 of a machinability testing device 50. Next, as illustrated in FIG. 9C, a stator specimen 30T was mounted on a movable device 54. The stator specimen 30T was manufactured by laminating eight electromagnetic steel plates having a distal end angle of 25° with a roundness of R0.2 (mm), a width of 5 mm, and a thickness of 0.5 mm (t=0.5). Next, a position of the stator specimen 30T was fixed in a state where a distal end of the stator specimen 30T mounted on the movable device 54 is in contact with the thermal spray film 14T in the thermal spray specimen 10T. Next, a high rotation motor 56 rotated the rotation rotor 53 at a rotation speed of 3000 rpm, and the movable device 54 pressed the stator specimen 30T to the thermal spray film 14T at a speed of 5 μm/rev. At a point when a pressing length became 500 μm, the rotation of the rotation rotor 53 was stopped. The machinability test was performed at an ambient

TABLE 1

|  | Example 1 | Example 2 | Example 3 | Example 4 | Comparative Example 1 | Comparative Example 2 | Comparative Example 3 |
|---|---|---|---|---|---|---|---|
| Contained Amount of h-BN Particles [mass %] | 6.0 | 4.5 | 3.0 | 2.5 | 7.5 | 1.8 | — |
| Area Ratio of Fe—3Si Particles [%] | About 40 | About 50 | About 75 | About 80 | About 35 | About 90 | About 98 | temperature of 150° C. by moving a mobile Kanthal heater 58 to arrange the thermal spray specimen 10T in a heating furnace 58a of the mobile Kanthal heater 58.

Figure 10:
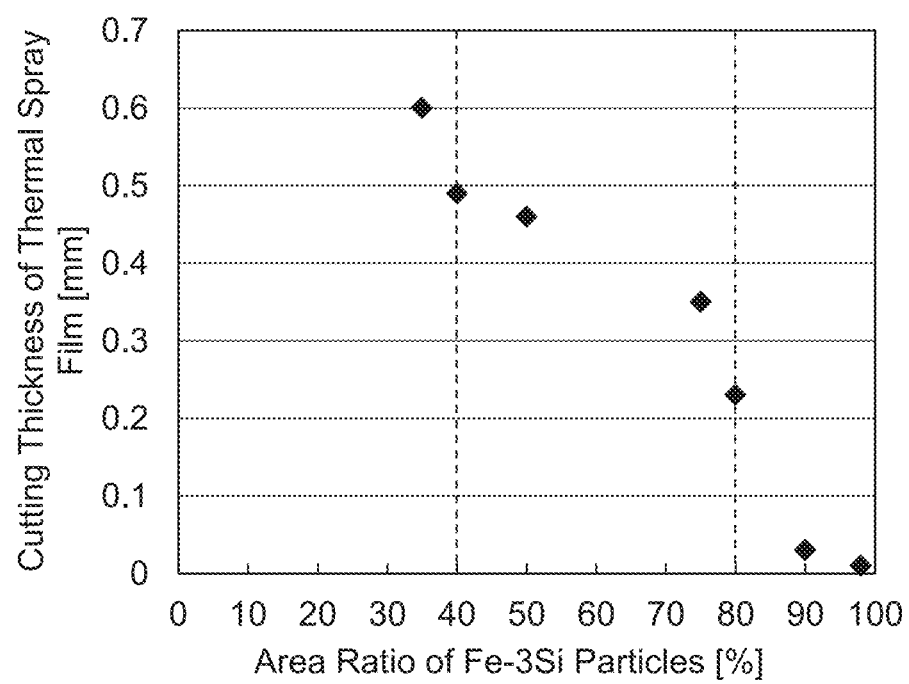
FIG. 10 is a graph illustrating a cutting thickness of the thermal spray film with respect to the area ratio of the Fe-3Si particles of the thermal spray film in Examples and Comparative Examples.
Figure 11:
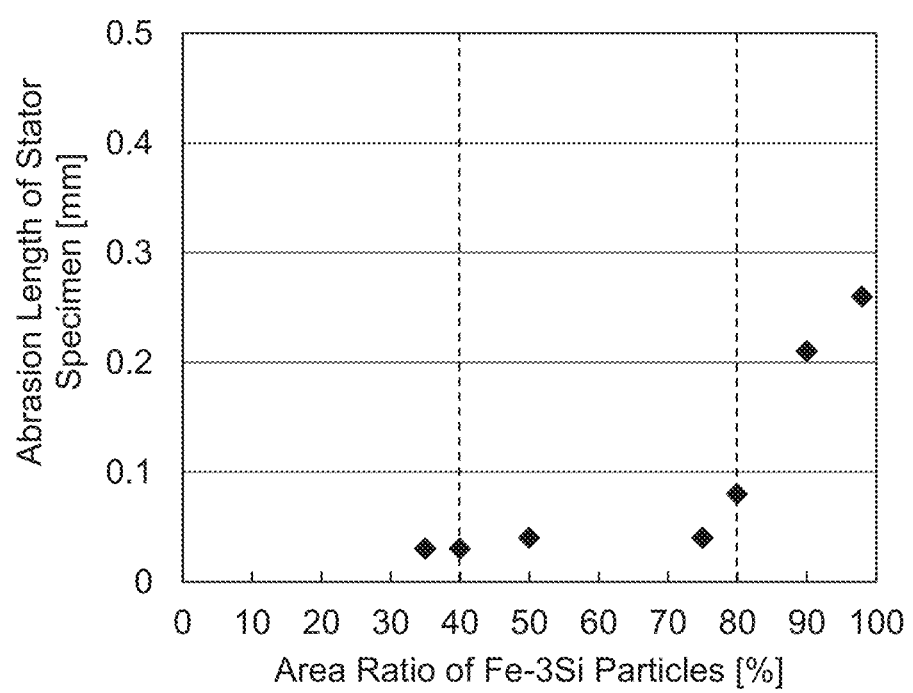
FIG. 11 is a graph illustrating an abrasion length of a stator specimen with respect to the area ratio of the Fe-3Si particles of the thermal spray film in Examples and Comparative Examples.

After the rotation stop of the rotation rotor 53, a cutting thickness of the thermal spray film 14T in the thermal spray specimen 10T was measured, and an abrasion length from the distal end of the stator specimen 30T was measured. FIG. 10 is a graph illustrating the cutting thicknesses of the thermal spray films with respect to the area ratios of the Fe-3Si particles of the thermal spray films in Examples and Comparative Examples. FIG. 11 is a graph illustrating the abrasion lengths of the stator specimens with respect to the area ratios of the Fe-3Si particles of the thermal spray films in Examples and Comparative Examples.

When the area ratio of the Fe-3Si particles of the thermal spray film 14T is less than 40%, the cutting thickness of the thermal spray film was substantially large as illustrated in FIG. 10. This is assumed to be due to a fragility of the thermal spray film 14T although it is because a part including a contact portion in the thermal spray film 14T, with which the stator specimen 301 is in contact, dropped off. On the other hand, when the area ratio of the Fe-3Si particles of the thermal spray film 14T exceeds 80%, the cutting thickness of the thermal spray film 14T was substantially small as illustrated in FIG. 10, and the abrasion length of the stator specimen 30T was substantially long as illustrated in FIG. 11. This is assumed to be due to a low machinability of the thermal spray film 14T. In this case, an abnormal sound was generated in the machinability testing device and the rotation of the rotation rotor 53 stopped before the pressing length becomes 500 μm. This is assumed to be due to the adhesion to the thermal spray film 14T of the stator specimen 30T which makes the pressure load against the thermal spray film 14T excessive. In contrast, when the area ratio of the Fe-3Si particles of the thermal spray film 14T is in a range of 40% to 80%, the part including the contact portion in the thermal spray film 14T, with which the stator specimen 30T is in contact, did not drop off, the rotation of the rotation rotor 53 did not stop before the pressing length becomes 500 μm, and the contact portion in the thermal spray film 14T was cut or depressed.

(Relative Magnetic Permeability)

Figure 12:
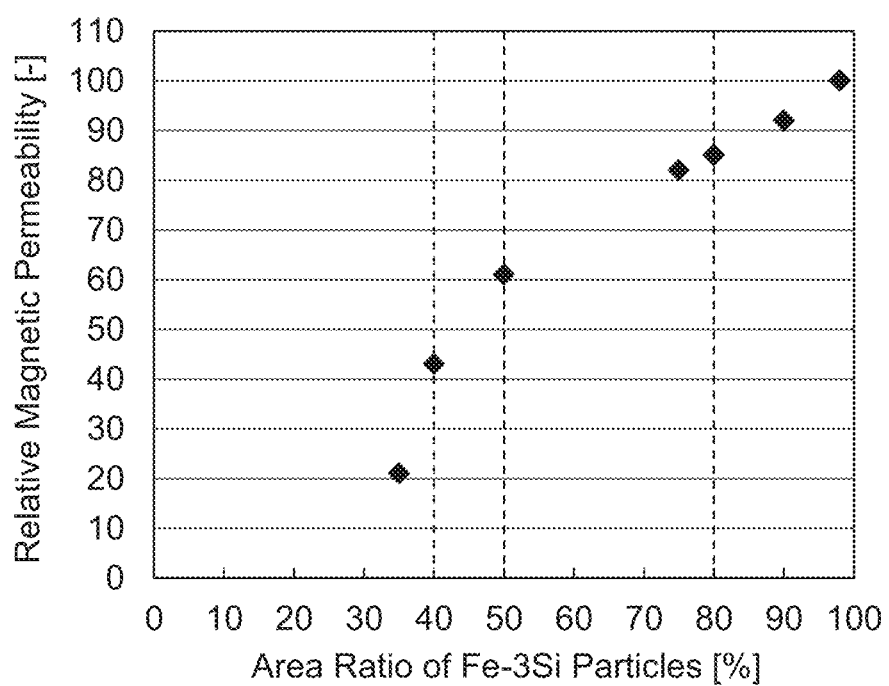
FIG. 12 is a graph illustrating a relative magnetic permeability of the thermal spray film with respect to the area ratio of the Fe-3Si particles of the thermal spray film in thermal spray specimens in Examples and Comparative Examples.

Relative magnetic permeabilities of the thermal spray films in the thermal spray specimens in Examples and Comparative Examples were obtained in a method using an AC magnetic properties measurement device. FIG. 12 is a graph illustrating the relative magnetic permeabilities of the thermal spray films with respect to the area ratios of the Fe-3Si particles of the thermal spray films in the thermal spray specimens in Examples and Comparative Examples.

As illustrated in FIG. 12, when the area ratio of the Fe-3Si particles of the thermal spray film is less than 50%, the relative magnetic permeability of the thermal spray film was substantially low. This is assumed to be due to a low volume ratio of the magnetic metal in the thermal spray film.

While the embodiment of the resolver according to the present disclosure have been described in detail above, the present disclosure is not limited thereto, and can be subjected to various kinds of changes in design without departing from the spirit and scope of the present disclosure described in the claims.

All publications, patents and patent applications cited in the present description are herein incorporated by reference as they are.

DESCRIPTION OF SYMBOLS

100 Resolver
10 Rotor
12 Rotor core
14 Porous machinable film
30 Stator
32 Stator core
34 Coil

What is claimed is:

1. A resolver comprising:
    a rotor having an oval shape when viewed in an axial direction; and
    a stator arranged to surround an outer peripheral surface of the rotor,
    wherein the rotor includes a rotor core, the stator includes a stator core and a coil, the stator core includes a plurality of teeth disposed at intervals along a circumferential direction and a cutting protrusion that projects toward the outer peripheral surface side of the rotor, the plurality of teeth project toward the outer peripheral surface side of the rotor, and the coil is wound around the plurality of teeth,
    the resolver is configured so that a gap permeance between the rotor and the stator varies in association with a rotation around a rotation axis of the rotor, and
    the rotor further includes a porous machinable film containing a magnetic metal, and the porous machinable film is disposed on a projecting portion on an outer peripheral surface of the rotor core,
    wherein the porous machinable film is configured to be cut by the cutting protrusion based on the cutting protrusion being in contact with the porous machinable film when the rotor rotates.

2. The resolver according to claim 1,
    wherein the porous machinable film is a thermal spray film.

3. The resolver according to claim 1,
    wherein the porous machinable film is a cold spray film.

4. The resolver according to claim 1,
    wherein the magnetic metal has an area ratio in a range of 40% to 80%.

5. The resolver according to claim 1,
    wherein the porous machinable film further contains a solid lubricant.

* * * * *